(12) United States Patent
Mishra

(10) Patent No.: US 9,176,665 B2
(45) Date of Patent: Nov. 3, 2015

(54) FLEXIBLE USER INPUT DEVICE SYSTEM

(75) Inventor: Garima Mishra, Bangalore (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 2390 days.

(21) Appl. No.: 12/011,931

(22) Filed: Jan. 30, 2008

(65) Prior Publication Data

US 2009/0189865 A1 Jul. 30, 2009

(51) Int. Cl.
*G06F 3/0488* (2013.01)
*G06F 3/01* (2006.01)

(52) U.S. Cl.
CPC ............ *G06F 3/04886* (2013.01); *G06F 3/018* (2013.01)

(58) Field of Classification Search
CPC ............................ G06F 3/0426; G06F 3/04886
USPC ......................................................... 345/173
See application file for complete search history.

(56) References Cited

U.S. PATENT DOCUMENTS

| | | | |
|---|---|---|---|
| 4,531,119 A | 7/1985 | Nakayama et al. | |
| 5,387,042 A | 2/1995 | Brown | |
| 5,945,928 A | 8/1999 | Kushler et al. | |
| 6,271,835 B1 | 8/2001 | Hoeksma | |
| 6,281,886 B1 | 8/2001 | Raneri | |
| 6,357,940 B1 | 3/2002 | Murphy | |
| 6,724,370 B2* | 4/2004 | Dutta et al. | 345/173 |
| 6,832,354 B2 | 12/2004 | Kawano et al. | |
| 7,036,086 B2 | 4/2006 | Cobbley et al. | |
| 2005/0099403 A1* | 5/2005 | Kraus et al. | 345/173 |
| 2005/0253816 A1* | 11/2005 | Himberg et al. | 345/173 |
| 2006/0181532 A1 | 8/2006 | Ravindra et al. | |
| 2007/0097421 A1* | 5/2007 | Sorensen et al. | 358/1.15 |
| 2007/0152980 A1 | 7/2007 | Kocienda et al. | |
| 2008/0259039 A1* | 10/2008 | Kocienda et al. | 345/173 |

* cited by examiner

*Primary Examiner* — Waseem Moorad
(74) *Attorney, Agent, or Firm* — Hewlett-Packard Patent Department

(57) ABSTRACT

A flexible user input system, comprising a computing system having a display device and a flexible user input device with a touch screen display member, the flexible user input device configured to concurrently display at least two user input interface representations.

18 Claims, 4 Drawing Sheets

FLEXIBLE USER INPUT DEVICE SYSTEM

BACKGROUND

Keyboards are typically configured for a single language. In some instances, the same keyboard can be used for multiple languages by having one key represent different letters, characters, and/or symbols in another language. However, such a keyboard is typically limited to, at most, three languages as each key becomes overcrowded with multiple characters and/or symbols printed on each key. Furthermore, such keyboards cannot be easily interchanged for use with other languages without replacing all the keys on the keyboard, thereby resulting in replacement of the entire keyboard itself.

DETAILED DESCRIPTION OF THE DRAWINGS

Figure 1:
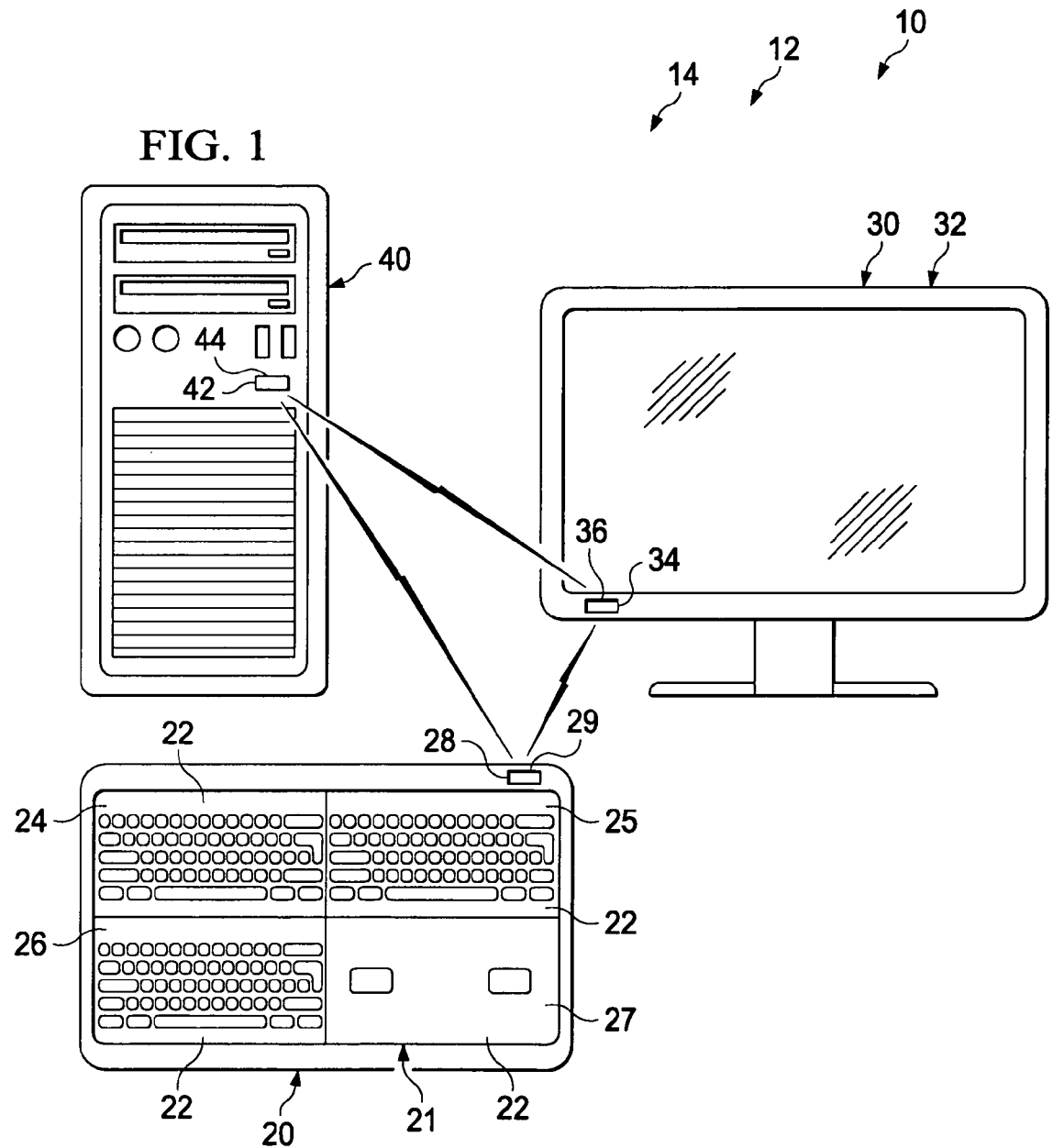
FIG. 1 is a diagram illustrating a flexible user input system in which an embodiment of a flexible user input device is employed to advantage.

FIG. 1 is a diagram illustrating a flexible user input system 10 in which an embodiment of a flexible user input device 20 is employed to advantage. Flexible user input system 10 is configured to enable a computing system 12 to interface with a flexible user input device 20 configured to present/display a plurality of different user input interface representations on flexible user input device 20. In the illustrated embodiment, flexible user input system 10 comprises a computing system 12, flexible user input device 20, a display device 30, and a computing tower 40. In FIG. 1, computing system 12 is a desktop computer 14. However, it should be understood that computing system 12 can be any type of computing device such as, but not limited to, a laptop computer, a notebook computer, a tablet interface representation computer, a personal digital assistant (PDA), a phone, or any other type of portable or non-portable computing device.

In FIG. 1, flexible user input device 20 is a touch screen display member 21 configured to concurrently present/display a plurality of user input interface representations 22. User input interface representations 22 are interactive images and/or content which are generated and graphically represented on display member 21 of flexible user input device 20 (e.g., a keyboard interface representation, a touch pad interface representation, a tablet interface representation, a writing pad interface representation, etc.). In FIG. 1, flexible user input device 20 comprises a keyboard interface representation 24, a keyboard interface representation 25, a keyboard interface representation 26 and a touch pad interface representation 27. It should be understood, however, that flexible user input device 20 may comprise different quantities and/or types of user input interface representations 22 than illustrated. Flexible user input device 20 also comprises a wireless transceiver 28 enabling flexible user input device 20 to interface with another component of system 12, such as display device 30 and/or computer tower 40.

In the illustrated embodiment, display device 30 is a monitor; however, it should be understood that display device 30 can be any type of device which is configured to display information to a user (e.g., a television unit, a touch screen display unit, etc.). Computing tower 40 provides processing and storage capability for computing system 12. In FIG. 1, display device 30 and computing tower 40 each comprise respective wireless transceivers 34 and 42. Wireless transceivers 34 and 42 are configured to transmit and/or receive wireless transmissions to and/or from flexible user input device 20 and/or each other. In FIG. 1, wireless transceivers 28, 34, and 42 are infrared transmission transceivers 29, 36, and 44; however, it should be understood that wireless transceivers 28, 34, and 42 can use any other type of wireless communication signals (e.g., Bluetooth, radio frequency, Wi-Fi, etc.).

In operation, flexible user input device 20 communicates with computing tower 40 and display device 30 using respective wireless transceivers 28, 34, and 42. In some embodiments, in response to a user entering an input into one of the user input interface representations 22 of flexible user input device 20 (e.g., keyboard interface representations 24, 25, or 26 or touch pad interface representation 27), flexible user input device 20 processes the input and communicates the input to display device 30 and/or computing tower 40 for processing. For example, if a user slides a finger across touch pad interface representation 27, flexible user input device 20 processes the movement of the finger and the input is processed and/or otherwise displayed by computing tower 40 and/or display device 30.

Figure 2:
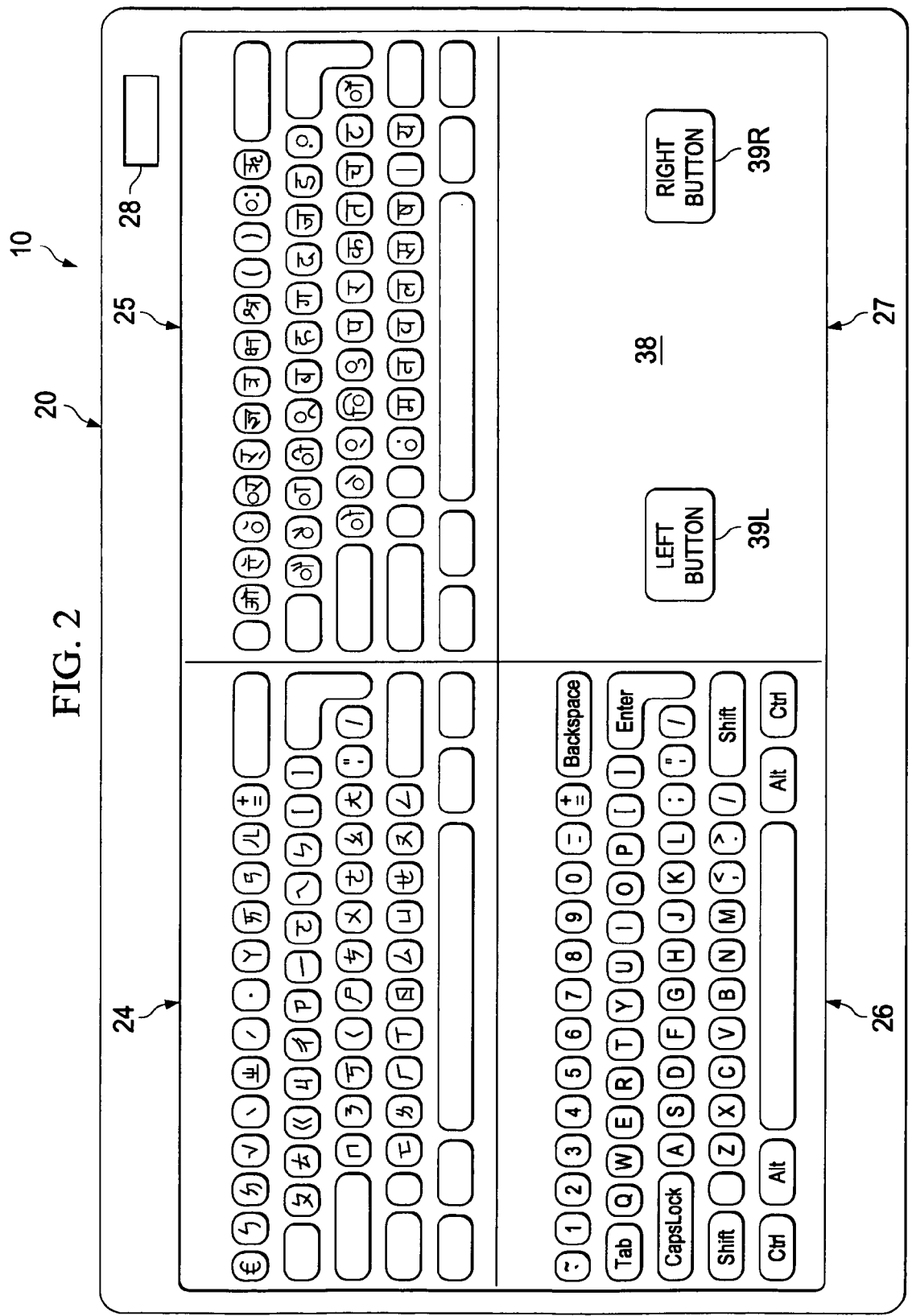
FIG. 2 is a diagram illustrating an enlarged view of the flexible user input device of FIG. 1.

FIG. 2 is a diagram illustrating an enlarged view of flexible user input device 20 of FIG. 1. In FIG. 2, keyboard interface representation 24 is configured with Chinese alphanumeric symbols (e.g., pin-ying), keyboard interface representation 25 is configured with Hindi alphanumeric symbols (e.g., devanágari), and keyboard interface representation 26 is configured with English alphanumeric symbols. In some embodiments, keyboard interface representations 24 and 25 may comprise one or more keys in another language (e.g., backspace, tab, enter, etc.). In FIG. 2, touch pad interface representation 27 is configured to function as a mouse pad 38 (e.g., sliding a cursor left and right, tapping, etc.) having a left button 39L and a right button 39R. It should be understood, however, that each of keyboard interface representations 24, 25, and 26 may be configured in a different language other than the languages illustrated. It should also be understood that flexible user input device 20 may comprise other types of user input interface representations 22.

Figure 3:
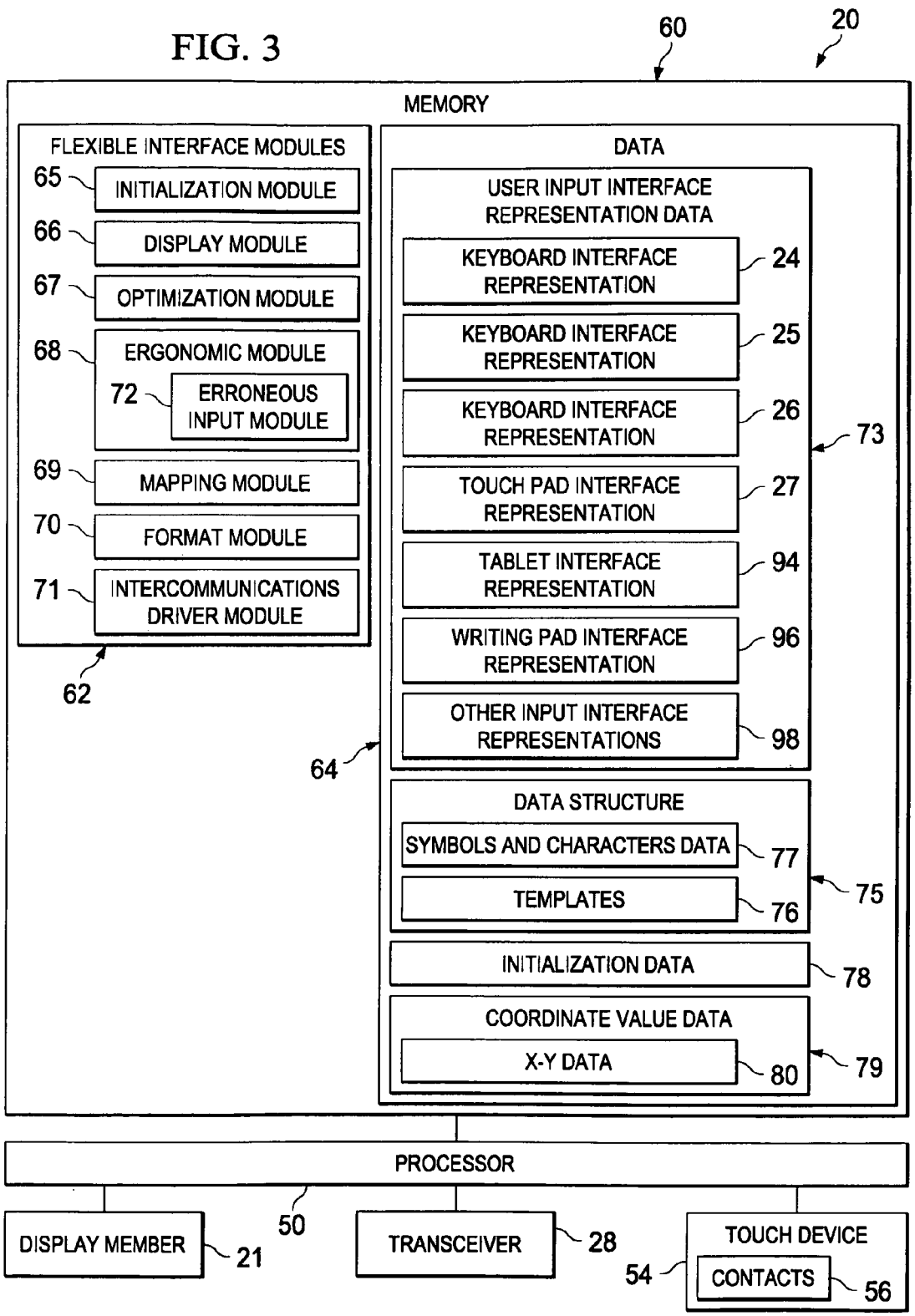
FIG. 3 is a block diagram illustrating an embodiment of a flexible user input device.

FIG. 3 is a block diagram illustrating an embodiment of flexible user input device 20. Components of flexible user input device 20 may comprise hardware, software, firmware, or any combination thereof. In FIG. 3, flexible user input device 20 comprises transceiver 28, a processor 50, a display member 21, a touch device 54, and a memory 60. In the illustrated embodiment, touch device 54 recognizes the input selected by a user and input into display member 21. In FIG. 3, touch device 54 comprises one or more contacts 56 disposed along the edge and/or corners of flexible user input device 20. Contacts 56 detect a position and/or location on flexible user input device 20 where input is received so that the input can be correlated to a particular interface representation (e.g., keyboard interface representation 24, keyboard interface representation 25, keyboard interface representation 26, touch pad interface representation 27, etc.). It should be understood, however, that touch device 54 can be any type of touch recognition system including, but not limited to, an optical recognition system, light sensing system, and a touch sensing system.

In FIG. 3, memory 60 comprises flexible interface modules 62 and data 64. In FIG. 3, flexible interface modules 62 are illustrated as being stored in memory 60 so as to be accessible and/or executable by processor 50. However, it should be understood that a portion and/or all of flexible interface modules 62 may be otherwise stored (e.g., in computer tower 40 of FIG. 1). In FIG. 3, flexible interface modules 62 comprise an initialization module 65, a display module 66, an optimization module 67, an ergonomic module 68, a mapping module 69, a format module 70, and an intercommunications driver module 71. In the illustrated embodiment, initialization module 65 identifies and/or stores the user input interface representations 22 (FIGS. 1 and 2) to be presented during boot-up and/or initialization processes of flexible user input device 20. In some embodiments, initialization module 65 presents a predetermined set of user input interface representations 22 (e.g., a default set, the last presented set of user input interface representations, etc.). In some embodiments, initialization module 65 presents a menu and/or other type of graphical user interface (GUI) enabling a user to select which of user input interface representations 22 to present. In FIG. 3, display module 66 synchronizes (e.g., timing, etc.) the data associated with user input interface representations 22 with display member 21 to ensure that display member 21 can present user input interface representation 22. In some embodiments, display module 66 synchronizes the data used by initialization module 65 to ensure that the user input interface representations 22 presented during initialization corresponds with the processes associated with initialization module 66.

In FIG. 3, optimization module 67 dynamically determines and/or calculates an optimum and/or efficient layout for displaying and/or presenting each of user input interface representations 22 on display member 21. In some embodiments, optimization module 67 equally divides display member 21 such that each of the displayed user interface representations 22 have equal portions and/or presentation space on display member 21. It should be understood, however, that, instead of equally dividing the area of display member 21, optimization module 67 may divide display member 21 based on the type of user interface representations 22 to be displayed on display member 21 (e.g., assigning larger portions of display member 21 to keyboard user interface representations 24, 25, and 26 than touch pad interface representation 27). In some embodiments, a user may determine and/or alter the location of a portion or all of the user input interface representations 22 to be presented on display member 21. In this embodiment, optimization module 67 can determine and/or recalculate an optimum and/or efficient layout based on the user preferences.

In FIG. 3, ergonomic module 68 is configured to function in association with optimization module 67. Ergonomic module 68 is configured to identify an ergonomic position for each of user input interface representations 22 presented on display member 21. For example, in some embodiments, ergonomic module 68 may identify a minimum size for each key on a keyboard interface representation so that the keys are not too close in proximity to each other or small so as to prevent a user from potentially developing carpal tunnel syndrome. In this embodiment, a size threshold and/or limit for each key and/or keyboard interface representation may be established and/or set by a user, a manufacturer of flexible user interface 20, or an administrator of computing system 12 and stored in memory 60. In some embodiments, ergonomic module 69 may comprise an erroneous input module 72 configured to substantially prevent the selection of another element of another user input interface representation 22 (e.g., accidental and/or inadvertent selection of a key on another user input interface representation 22 by a user's wrist). In some embodiments, erroneous input module 72 enables a user to select one or more of the presented user input interface representations 22 (e.g., a "select" button, etc.). Upon selection, in some embodiments, erroneous input module 72 can deactivate the unselected user input interface representations 22 by deactivating and/or disconnecting the sensors and/or current corresponding to the unselected user input interface representations 22. In some embodiments, erroneous input module 72 can automatically move the selected user input interface representation 22 to a position peripheral to a wrist pad, a lower edge of flexible user input interface 20, and/or other location on display member 21. In some embodiments, erroneous input module 72 can automatically move the selected user input interface representation 22 to the center of display member 21, thereby overlaying the other presented user input interface representations 22. In this embodiment, erroneous input module 72 can also deactivate the other user input interface representations 22.

In the illustrated embodiment, mapping module 69 correlates and/or maps each element (e.g., a key, button, etc.) of user input interface representations 22 to a location on display member 21 (FIG. 1) of flexible user input device 20. Thus, mapping module 69 enables flexible user input device 20 to recognize and/or translate a corresponding action and/or input entered into flexible user input device 20 by a user. In some embodiments, mapping module 69 interfaces with display module 66 to synchronize the action and/or input entered into display member 21 of flexible user input device 20. In some embodiments, format module 70 identifies the format (e.g., the relative position of keyboard interface representations 24, 25, and 26, touch pad interface representation 27, etc.) for each of user input interface representations 22 presented on display member 21. In some embodiments, format module 70 also determines the corresponding size of each of user input interface representations 22 based on the amount of space apportioned and assigned to each of user input interface representations 22 by optimization module 67. In FIG. 3, intercommunications driver module 71 is configured to recognize and/or identify an action and/or input entered by a user into display member 21 of flexible user input device 20. In some embodiments, intercommunications driver module 71 receives a signal from touch device 54 indicating an input into display member 21 and translates the input so that a corresponding action is reflected on display device 30 (FIG. 1).

In FIG. 3, data 64 comprises user input interface representation data 73, data structure 75, initialization data 78, coordinate value data 79, and mapping data 82. Components of data 64 may be stored and/or represented in any format, including but not limited to, a table, relational database, an XML database, a file, etc. In the illustrated embodiment, user input interface representation data 73 comprises data corresponding to the user input interface representations 22 presented on flexible user input device 20. In FIG. 3, user input interface representation data 73 comprises keyboard interface representation 24, keyboard interface representation 25, keyboard interface representation 26, touch pad interface representation 27, a tablet interface representation 94, a writing pad interface representation 96, and other input interface representations 98. In some embodiments, user input interface representation data 73 comprises layouts for a particular user interface representation 22 and the corresponding symbols mapped and/or disposed to a particular location/key for the respective user interface representation 22. For example, keyboard interface representation 24 comprises data representing a QWERTY keyboard having Chinese pin-ying symbols disposed and/or positioned on each key accordingly (e.g., keyboard interface representation 24 as illustrated in FIG. 2). In another example, touch pad interface representation 27 comprises data representing mouse pad 38 (FIG. 2) having the words "left button" and "right button" disposed on respective left button 39L and right button 39R. In some embodiments, other input interface representations 98 comprises data associated with other types of input interface representations and/or newly loaded and/or added input interface representations other than the illustrated user input interface representations.

Data structure 75 comprises the different types of user input interface representations 22 and the different symbols and/or characters for each element associated with each type of user input interface representations 22. In some embodiments, data structure 75 comprises templates data 76 and symbols and characters data 77. Templates data 76 comprises the different layouts and/or templates for each type of user input interface representation 22. For example, templates data 76 comprises a template for a left-handed mouse and/or a right-handed mouse. As another example, templates data 76 comprises a template for a QWERTY keyboard, a Dvorak simplified keyboard, a one-handed keyboard, and/or a numeric keypad. In some embodiments, symbols and characters data 77 comprises the different characters and/or languages which can be represented on each of the user input interface representations. For example, symbols and characters data 77 may comprise symbols and characters associated with the English, Chinese, Russian, Japanese, Korean, and/or the Hindi alphabets and/or languages. As another example, symbols and characters data 77 comprise line thickness and/or other characteristics for stationary and/or background color for use with tablet interface representation and/or writing pad interface representation 96.

Initialization data 78 comprises data associated with the initialization and/or boot up processes of flexible user input device 20. In some embodiments, initialization data 78 identifies which of user input interface representations 74 and the corresponding languages 76 are to be presented to the user during initialization processes. In some embodiments, initialization data 78 comprises a set of default user input interface representations 22 determined by an administrator and/or manufacturer of flexible user input system 10. In some embodiments, initialization data 78 comprises the last set of user input interface representations 22 selected and presented on flexible user interface 20.

Coordinate value data 79 comprises coordinate values and/or location data for display member 21 of flexible user input device 20. In some embodiments, coordinate value data 79 comprises a grid-like pattern in which display member 21 is divided and assigns a value identifying the location of a component within the grid-like pattern. In some embodiments, coordinate value data 79 comprises a set of x-y data 80 assigning an x-y value to each coordinate value in the grid-like pattern. In FIG. 3, mapping data 79 comprises data mapping a location and/or position on flexible user input device 20 with an element of user input interface representation 22. In some embodiments, mapping data 79 comprises an x-y coordinate value for each element, thereby enabling thereby enabling intercommunication driver module 71 to identify and/or recognize the input entered by a user into flexible user input device 20 and correlate the input to a particular user input interface representation 22. In some embodiments, mapping data 79 is dynamically generated once user input interface representations 22 are selected and/or presented on flexible user input device 20.

Thus, during initialization processes, initialization module 65 identifies which of user input interface representations 22 to present on display member 21 as indicated by initialization data 78. In some embodiments, initialization data 78 is predetermined (e.g., default data, previously selected settings, etc.) in which a user can optionally change at a later time. In this embodiment, initialization data 78 may reference user input interface representation data 73 (e.g., keyboard interface representations 24, 25, and 26, and touch pad interface representation 27) to identify which of user input interface representations to present. In some embodiments, initialization data 78 can include a menu and/or other similar listing of available user input interface representations 22 and corresponding data structure 75 to be presented to a user for selection during initialization processes. In this embodiment, initialization data 78 can store the user selections as user input interface representation data 73 for presentation on display member 21. It should be understood, however, that display module 66 may also be executed when a user elects to modify the options identified in initialization data 78 during operation of flexible user input device 20.

After user input interface representations 22 are determined, optimization module 67 dynamically apportions and assigns a location for each of user input interface representations 22 (e.g., keyboard interface representation 24, keyboard interface representation 25, keyboard interface representation 26, and touch pad interface representation 27). In some embodiments, optimization module 67 identifies the total number of user input interface representations 22 identified to be displayed on display member 21. In some embodiments, optimization module 67 divides the total area of the display member 21 by the total number of user input interface representations 22 to determine the amount of space that each of the displayed user interface representations 22 will encompass. In some embodiments, optimization module 67 then correlates the total number of user input interface representations 22 with a particular layout. For example, if a total of four user input interface representations 22 are identified, then optimization module 67 identifies the layout with four equally partitioned portions of display member 21 (e.g., layout illustrated by flexible user interface 20 in FIGS. 1 and 2). Optimization module 67 then dynamically apportions and assigns each of the user input interface representations 22 to a particular portion and/or location of display member 21. In some embodiments, optimization module 67 assigns the user input interface representations 22 in order of selection and/or prioritization by a user. In some embodiments, optimization module 67 assigns the user input interface representations 22 by a predetermined default system. Furthermore, in some embodiments, optimization module 67 apportions the user input interface representations 22 in a left-to-right and top-bottom order. However, it should be understood, that optimization module 67 may use other combinations and/or types of apportioning and/or assignment methods.

In some embodiments, ergonomic module 68 determines and/or identifies the most ergonomic presentation of each of user input interface representation 22. In this embodiment, ergonomic module 68 identifies which of the ergonomic modules comprise a keyboard interface representation (e.g., keyboard interface representation 24, 25, or 26). Ergonomic module 68 then identifies a size of each of user input interface representations 22 based on the amount of space apportioned by optimization module 67. If the size of the keyboard interface representation is smaller than the size threshold for the keyboard interface representation, then ergonomic module 68 identifies that the size threshold for each keyboard interface representation (and also each key therein) is exceeded and, therefore, each key for each keyboard interface representation is too close in proximity to each other. As a result, in some embodiments, ergonomic module 68 may request that the user reduce the number of total presented user input interface representations 22 and/or keyboard interface representations.

In some embodiments, format module 70 determines the position for each user input interface representation 22. Format module 70 may reference user input interface representation data 73 to identify the type of user input interface representation 22 and the corresponding symbols and characters to be presented on each user input interface representation 22. Format module 70 also identifies the corresponding size for each of user input interface representations 22 based on the apportioned size identified and/or defined by optimization module 67. Thus, for example, format module 70 identifies a size of keyboard interface representation 24 stored in user input interface representation data 73. Format module 70 then multiplies keyboard interface representation 24 by a factor based on the amount of space apportioned to keyboard interface representation 24. Format module 70 then identifies an appropriate position on display member 21 for each of user input interface representations 22 (e.g., upper left hand corner for keyboard interface representation 24, upper right hand corner for keyboard interface representation 25, etc.). Mapping module 69 then assigns a coordinate value for each user input element of each user input interface representation 22 to be presented on display member 21 and used in processing the input entered by a user in flexible user input device 20. In some embodiments, mapping module 69 references coordinate value data 79 and/or x-y data 80 to assign a coordinate value for each user input element. Mapping module 69 stores the coordinate value and the corresponding element as mapping data 82. Display module 66 then synchronizes data 64 with flexible interface modules 62 and presents user input interface representations 22 on display member 21 for use by the user.

In operation, intercommunications driver module 71 receives a signal indicating that contacts touch device 54 sensed an input entered into display member 21 of flexible user input device 20. Mapping module 69 then correlates the location of the input with the coordinate value stored in mapping data 82 to interpret and/or identify the input entered. Display module 66 then presents the corresponding input and/or action on display member 21. In some embodiments, display module 66 can interface with intercommunications driver module 71 to present the corresponding action on display device 30. In some embodiments, display module 66 can transmit the input to processor 50 for further processing by another application and/or component of electronic device 10.

In some embodiments, optimization module 67 dynamically recalculates and/or determines a new layout for presenting each of user input interface representations 22 on display member 21 in response to a user selecting to reposition and/or select a different one or more of the user input interface representations. For example, in some embodiments, a user may select (e.g., select and drag, select using a drop-down menu, etc.) to interchange the positions of keyboard interface representations 24 and 25. In another example, a user may device to replace keyboard interface representation with writing pad interface representation 96. In this embodiment, optimization module 67 dynamically determines a new layout for the selected user input interface representations 22 based on the changes requested. In some embodiments, ergonomic module 68 also resizes the user input interface representations 22 depending on the selected locations for the user input interface representations 22.

In some embodiments, flexible interface module executes erroneous input module 72 to substantially prevent a user from selecting another element of another user input interface representation 22. In this embodiment, erroneous input module 72 can deactivate one or more user input interface representations 22 in response to a user selecting the user input interface representation 22 (e.g., using a "select button, touching one element within the user input interface representation 22). In some embodiments, erroneous input module 72 can move and/or relocate the selected user input interface representations 22 (e.g., the center of display member 21, a position peripheral to a wrist pad, etc.).

Figure 4:
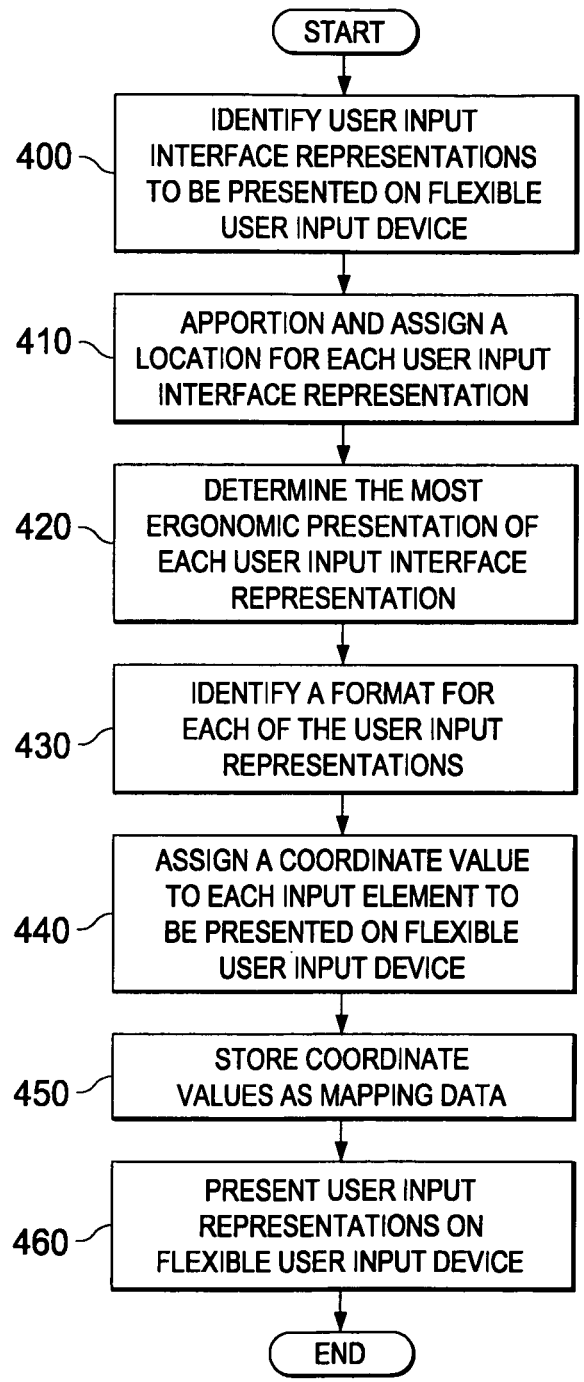
FIG. 4 is a flowchart illustrating an embodiment of a flexible user input device usage method.

FIG. 4 is a flowchart illustrating an embodiment of a flexible user input device usage method. The method begins at block 400 with initialization module 65 initializing and identifying which of user input interface representations 22 are to be presented/displayed on display member 21 based on the initialization information stored in initialization data 78. In some embodiments, initialization of display module 66 coincides with the time that computing system 12 initializes. In some embodiments, initialization of display module 66 beings when flexible user input device itself initializes (e.g., a user pressing a power button disposed on flexible user input device 20).

After display module 66 identifies which of user input interface representations 22 are to be displayed, optimization module 67 apportions and assigns a location for each of user input interface representations 22 on display member 21 (block 410). In some embodiments, ergonomic module 68 then determines and/or identifies an ergonomic presentation of each of user input interface representations 22 on display member 21 (block 420). Format module 70 then determines the position and corresponding character for each component for each of user input interface representations 22 (block 430). In some embodiments, format module 70 also sizes each of user input interface representations 22 based on the apportioned space defined by optimization module 67. Mapping module 69 then assigns and/or maps a coordinate value to each input element associated with each of user input interface representations 22 to be presented on flexible user input device 20 (block 440). In some embodiments, one or more x-y coordinate values are assigned to each input element or user input interface representation element. Display module 66 then stores the assigned coordinate values as mapping data 82 for use in operation of flexible user input device 20 (block 450). Display module 66 then presents user input interface representations 22 on flexible user input device 20 (block 450), with the process terminating thereafter.

The illustrative embodiments may be implemented in software and can be adapted to run on different platforms and operating systems. In particular, functions implemented by flexible user input device 20, for example, may be provided by an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electro-magnetic, infrared, or semiconductor system, apparatus, device, or propagation medium.

Thus, embodiments of flexible user input device 20 enable a user to identify and/or customize a keyboard with a variety of different keyboards and/or input devices. Furthermore, flexible user input device 20 is configured so that multiple languages are presented on a single keyboard without having to replace the keyboard for use with another language.

What is claimed is:

1. A computing system comprising:
a component providing processing and storage capability;
a display device; and
a flexible user input device with a touch screen display member, the flexible user input device configured to concurrently display a plurality of user input interface representations on the touch screen display member, wherein the plurality comprises at least two keyboard interface representations to receive user input for display on the display device and a touch pad interface representation comprising a mouse pad representation.

2. The system of claim 1, wherein the flexible user input device further comprises:
an optimization module configured to dynamically apportion the touch screen display member for each user input interface representation; and
a format module configured to size each of the user input interface representations based on an amount of space apportioned for each user input interface representation.

3. The system of claim 1, wherein the flexible user input device further comprises an optimization module configured to determine a layout of the user input interface representation on the touch screen display member based on a number of user input interface representations.

4. The system of claim 1, wherein the flexible user input device further comprises an ergonomic module configured to ergonomically size each input element of each user input interface representation.

5. The system of claim 1, wherein the flexible user input device further comprises an ergonomic module configured to determine if a quantity of user input interface representations to be displayed on the display member exceeds an ergonomic threshold set for the touch screen display member.

6. A flexible user input device, comprising:
a touch screen display member configured to receive a user selection of user input interface representations to be concurrently displayed on the touch screen display member, wherein the touch screen display member is configured to automatically determine a layout for selected user input interface representations based on a quantity of the selected user input interface representations, and wherein the selected user input interface representations comprise at least two keyboard interface representations to receive user input for display on a display device and a touch pad interface representation comprising a mouse pad representation.

7. The flexible user input device of claim 6, wherein the selected user input interface representations are automatically sized to prevent exceeding an ergonomic threshold.

8. The flexible user input device of claim 6, wherein the selected user input interface representations are automatically sized based on a number and type of user input interface representations selected.

9. The flexible user input device of claim 6, wherein the selected user input interface representations are equally apportioned on a portion of the touch screen display member.

10. The flexible user input device of claim 6, wherein position of at least one selected user interface representations is dynamically interchangeable with another selected user interface representation.

11. A flexible user input device usage method, comprising:
configuring a touch screen display member for a computing system to concurrently display a plurality of user input interface representations, the computing system having a display device, and a flexible user input device comprising the touch screen display member, wherein the plurality of user input interface representations comprise at least two keyboard interface representations to receive user input for display on the display device and a touch pad interface representation comprising a mouse pad representation.

12. The method of claim 11, further comprising dynamically apportioning the touch screen display member for each user input interface representation, and sizing each user input interface representation for presentation on the touch screen display member based on an amount of space apportioned for each user input interface representation.

13. The method of claim 11, further comprising configuring a layout for the user input interface representations on the touch screen display member based on a number of user input interface representations.

14. The method of claim 11, further comprising ergonomically sizing each input element of each user input interface representation, and determining if a quantity of user input interface representations to be displayed on the display member exceeds an ergonomic threshold set for the touch screen display member.

15. The system of claim 1, wherein the computing system is a desktop computer, the component comprising the processing and storage capability is a computing tower, and the display device is a monitor.

16. The system of claim 1, wherein the flexible user input device is wirelessly coupled to the display device.

17. The flexible user input device of claim 6, wherein the flexible user input device comprising the touch screen display member is configured to wirelessly couple to the display device.

18. The method of claim 11, configuring the flexible user input device to wirelessly couple to the display device.

* * * * *